May 17, 1955

R. PFISTERER 2,708,338

WATER- AND DUST-TIGHT WATCH-CASE

Filed Sept. 18, 1951

INVENTOR
Richard Pfisterer

BY

United States Patent Office 2,708,338
Patented May 17, 1955

2,708,338

WATER- AND DUST-TIGHT WATCH-CASE

Richard Pfisterer, Pforzheim, Germany

Application September 18, 1951, Serial No. 247,149
In Germany January 4, 1950

Public Law 619, August 23, 1954
Patent expires January 4, 1970

3 Claims. (Cl. 58—90)

This invention relates to a water- and dust-tight watch-case provided in its inner surface at the back of the watch-case with a recessed portion of enlarged diameter and with annular packing means arranged in said recessed portion and compressed by the closing pressure of the screwed-on cover of the watch-case.

It has already been known to provide water- and dust-tight watch-cases on their back with an interiorly enlarged and threaded portion which after introduction of a packing-ring is closed up by an exteriorly threaded cover.

However, in constructions of this known type it will frequently happen that when the cover is screwed into the interiorly enlarged portion of the watch-case the packing-ring is thereby displaced from its proper position and distorted or otherwise damaged to such an extent that it no longer constitutes a reliable sealing means for the interior of the watch-case. Another drawback of this known construction is caused by the fact that the housing in which the watch-work is enclosed may, when the cover is screwed into the watch-case, easily participate in the rotation and thus be displaced from its correct position with respect to the opening in the watch-case through which the shaft for winding up the watch is subsequently inserted.

To overcome these disadvantages of the known construction is the object of the present invention.

According to the invention the watch-case is provided on its back with an exteriorly threaded annular extension onto which, after the packing-ring has been arranged in the recessed portion of enlarged diameter and after the cover provided with an annular outer flange has been placed on the packing-ring, a fastening ring is screwed which for that purpose is provided with an interiorly threaded portion and which with an inwardly extending annular flange bears against the undersurface of the annular outer flange of the cover forcing thereby that annular outer flange against that packing ring.

Another improvement of the invention resides in the feature that the annular outer flange of the cover is provided with a projecting portion by means of which it engages in a recess provided in the inner wall of the aforesaid annular extension of the watch-case, so that no shifting of the cover and damaging of the packing ring can occur when the fastening ring is screwed onto the annular extension of the watch-case.

It is also possible to devise the construction in such a way that the cover of the watch-case simultaneously engages with its annular outer flange in a recessed portion of annular formation provided in the outer wall of the annular movement ring for the watch-work and that the annular movement ring is further provided with an annular outer flange adapted for engagement in another annular recess in the watch-case, so that when the fastening ring is screwed onto the annular extension of the watch-case, the annular outer flange of the cover is forced against the annular outer flange of the movement ring for the watch-work securing thereby the annular flange of the movement ring in its position within the aforesaid additional annular recess of the watch-case, whereby in order to obtain the required water- and dust-tight sealing a packing ring should be interposed between the annular flange of the cover and the annular flange of the movement ring.

In a construction like this the watch-case and the movement ring for the watch-work may be so designed that between the front end of the movement ring for the watch-work and the undersurface of the annular frame or stop for the watch-glass so much clearance exists that the upper side of the dial-plate is under no circumstances in contact with the annular frame or stop for the watch-glass, whereby possible differences in the thickness and convexity of the dial-plate have to be taken into consideration. This means that the plane in which the watch-work has to be arranged in the interior of the watch-case has to be determined exclusively by the position of the annular outer flange of the movement ring for the watch-work and by the position of the annular recess in the watch-case in which said outer flange of the movement ring engages. The advantage of a construction like this resides in the feature that the position of the watch-work within the watch-case is no longer influenced by the thickness and degree of convexity of the dial-plate and for that reason will always remain exactly the same regardless of the thickness and degree of convexity of the dial-plate, so that harmful variations of the plane in which the shaft for winding up the watch is positioned with respect to the center of the appertaining hole in the watch-case are eliminated, which hitherto have so frequently resulted in jamming and breaking of that shaft.

My invention will best be understood from a consideration of the following detailed description, taken in connection with the accompanying drawings, forming a part of this specification and in which I have illustrated by way of example an embodiment of my invention. However, I wish to say that my invention is not confined to any strict conformity with the showing of the drawings, but may be changed or modified, so long as such changes or modifications mark no material departure from the salient features of the invention as expressed in the appending claims.

In the drawings in which like parts are referred to by the same reference numerals:

Figure 1:
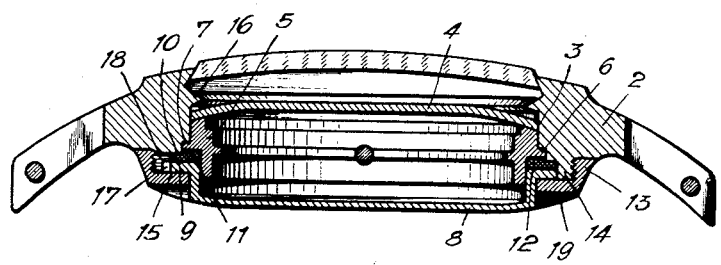
Fig. 1 is a central vertical section of the watch-case and annular supporting frame for the watch-work.
Figure 2:
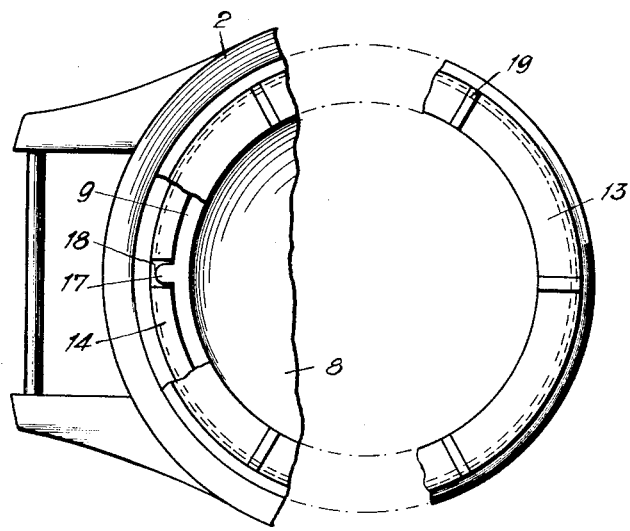
Fig. 2 is a rear view of the watch-case of Fig. 1; a portion of the fastening ring having been broken away to show how the projecting portion of the annular flange of the cover engages in a recess of the watch-case.

Referring now to the drawings in detail, the reference numeral 2 denotes the watch-case. Fitted into the portion 3 of the hollow interior of the watch-case from the back of the latter is the annular movement ring 5 for the watch-work and the dial-plate 4. The annular movement ring 5 has an outer flange 6 projecting into the recessed annular portion 7 of an enlarged diameter provided in the inner wall of the watch-case and serving as annular support for the ring 5. The cover 8 of the watch-case engages with its annular flange 9 partly in a second recessed portion 10 in the inner wall of the watch-case and partly in the recessed portion 11 of the outer wall of the annular movement ring 5, whereby between the upper surface of the annular flange 9 and the adjacent portions of the watch-case and annular movement ring a packing ring 12 is interposed. The fastening ring 13 is provided with an interiorly threaded portion by means of which it is screwed onto the exteriorly threaded portion 14 of the watch-case, whereby the inner annular surface 15 of the fastening ring is bearing against the undersurface of the annular flange 9 of the bottom 8 and forcing that flange against the packing ring 12. It will be seen that in this way not only a water- and dust-tight sealing of the interior of the watch-case is obtained, but that simultaneously the annular movement ring 5 and the watchwork carried by it are always and under all circumstances tightly secured to the watch-case 2 by means of the flange 6 and the recess 7 regardless of the thickness and degree of convexity of the dial-plate and contrary to the formerly customary construction in which the dial-plate 4 was resting against the annular supporting frame or stop 16 for the watch-glass. From an inspection of the drawings it will further be seen that the annular flange 9 is provided with a projecting portion 17 adapted for engagement in a third recess 18 in the inner wall of the watch-case 2, so that when the fastening ring 13 is screwed onto the threaded portion 14 of the watch-case 2 the cover 8 cannot participate in the rotation, whereby displacement and distortion of the packing means 12 as a possible result of such rotation is reliably prevented. The fastening ring 13 is provided at diametrically opposed places of its circumference with a plurality of recesses or slots 19 for the engagement therein of a tightening instrument of known construction when the fastening ring is screwed onto the portion 14.

When fitting the annular movement ring 5 into the watch-case 2 the shaft for winding up the watch has to be in correct position with respect to the hole in the watch-case through which the end of the shaft extends from the watch-case. If, because of this necessity, the flange 6 does not completely fill up the recess 7 (as illustrated in Fig. 1) this is no obstacle for a tight and reliable seat of the ring 5 in the watch-case 2, as the elastic packing means 12 when subjected to the closing pressure of the fastening ring 13 will automatically fill up the gap and through pressure exerted against the undersurface of the flange 6 will secure the flange in immovable position within the recess 7 of the watch-case 2.

The novel watch-case may preferably be gold-plated at the places visible to the eye, while the parts which are in contact with the skin of the wearer, i. e. the cover 8 and the fastening ring 13 may be produced from the superrefined steel which is ordinarily employed in the manufacture of articles of this kind.

What I claim as new and desire to secure by Letters Patent of the United States is:

1. A watch, comprising, in combination, an annular watch case having a first intermediate inner cylindrical portion, an outwardly threaded rear end portion of a larger diameter than said first intermediate portion, and a second intermediate inner cylindrical portion located between said first inner portion and rear end portion of said watch case and being of a larger diameter than said first intermediate portion and of a smaller diameter than said rear end portion of said watch case so as to provide a first shoulder between said first and second intermediate inner portions of said watch case and a second shoulder between said second and rear end portions of said watch case, said watch case having a flat, rear end face and being formed in said rear end portion thereof with a cutout; a movement ring having an outer diameter approximately equal to the inner diameter of said first intermediate portion of said watch case and being located in said first intermediate portion, said movement ring having an annular flange approximately equal in diameter to said second intermediate portion of said watch case and being located at one side thereof against said first shoulder; a packing ring having an outer diameter approximately equal to the inner diameter of said rear end portion of said watch case and being located in said rear end portion thereof and against said second shoulder and the side of said flange of said movement ring opposite to said first shoulder; a circular cover member having an outer diameter approximately equal to the inner diameter of said rear end portion of said watch case and being located with the outer peripheral portion thereof against said packing ring on the opposite side thereof from said second shoulder, said cover member having a projection extending from the periphery thereof and located in said cutout to prevent turning of said cover member; and an internally threaded clamping ring threadedly engaging said rear end portion of said watch case and having an inner annular portion located against said rear face of said watch case and against said peripheral portion of said cover member on the opposite side thereof from said packing ring to press said cover member against said packing ring, said packing ring against said second shoulder and flange, and said flange against said first shoulder.

2. A watch, comprising, in combination, an annular watch case having a first intermediate inner cylindrical portion, a rear end portion of a larger diameter than said first intermediate portion, and a second intermediate inner cylindrical portion located between said first inner portion and rear end portion of said watch case and being of a larger diameter than said first intermediate portion and of a smaller diameter than said rear end portion of said watch case so as to provide a first shoulder between said first and second intermediate inner portions of said watch case and a second shoulder between said second and rear end portion of said watch case, said rear end portion of said watch case being formed with a cutout; a movement ring having an outer diameter approximately equal to the inner diameter of said first intermediate portion of said watch case and being located in said first intermediate portion, said movement ring having an annular flange approximately equal in diameter to said second intermediate portion of said watch case and being located at one side thereof against said first shoulder; a packing ring having an outer diameter approximately equal to the inner diameter of said rear end portion of said watch case and being located in said rear end portion thereof and against said second shoulder and the side of said flange of said movement ring opposite to said first shoulder; a circular cover member having an outer diameter approximately equal to the inner diameter of said rear end portion of said watch case and being located with the outer peripheral portion thereof against said packing ring on the opposite side thereof from said second shoulder, said cover member having a projection extending from the periphery thereof and located in said cutout to prevent turning of said cover member; and a threaded clamping ring threadedly engaging said rear end portion of said watch case and having an annular portion located against said peripheral portion of said cover member on the opposite side thereof from said packing ring to press said cover member against said packing ring, said packing ring against said second shoulder and flange, and said flange against said first shoulder.

3. A watch, comprising, in combination, an annular watch case having a first intermediate inner cylindrical portion, a rear end portion of a larger inner diameter than said first intermediate portion, and a second intermediate inner portion located between said first inner portion and rear end portion of said watch case and being of a larger diameter than said first intermediate portion and a smaller diameter than said rear end portion of said watch case so as to provide a first shoulder between said first and second intermediate inner portions of said watch case and a second shoulder between said second and rear end portion of said watch case, said rear end portion of said watch case being formed with a cutout; a movement ring having an outer diameter approximately equal to the inner diameter of said first intermediate portion of said watch case and being located in said first intermediate portion, said movement ring having an annular flange approximately equal in diameter to said second intermediate portion of said watch case and being located at one side thereof against said first shoulder, said movement ring having a cylindrical portion extending rearwardly from said annular flange thereof; a packing ring having an outer diameter approximately equal to the inner diameter of said rear end portion of said watch case and an inner diameter approximately equal to the outer diameter of said cylindrical portion of said movement ring, said packing ring being located about said cylindrical portion of said movement ring in said rear end portion of said watch case and against said second shoulder and the side of said annular flange of said movement ring opposite from said first shoulder; a circular cover member formed in its interior with a cylindrical recess having a diameter approximately equal to the outer diameter of said cylindrical portion of said movement ring and having a peripheral portion of an outer diameter approximately equal to the inner diameter of said rear end portion of said watch case, said cover member being located about said cylindrical portion of said movement ring in said rear end portion of said watch case against said packing ring on the side thereof opposite from said second shoulder, and said cover member having a projection located in said cutout of said rear end portion of said watch case; and a clamping ring threadedly engaging said rear end portion of said watch case and being located against said peripheral portion of said cover member to press said cover member against said packing ring, said packing ring against said second shoulder and flange, and said flange against first shoulder.

References Cited in the file of this patent

UNITED STATES PATENTS

| | | |
|---|---|---|
| 2,154,876 | Thompson | Apr. 18, 1939 |
| 2,317,322 | Whitehead | Apr. 20, 1943 |

FOREIGN PATENTS

| | | |
|---|---|---|
| 218,583 | Switzerland | Apr. 16, 1942 |
| 219,203 | Switzerland | May 1, 1942 |
| 226,961 | Switzerland | Aug. 2, 1943 |
| 230,220 | Switzerland | Mar. 1, 1944 |
| 235,810 | Switzerland | May 1, 1945 |
| 239,243 | Switzerland | Jan. 3, 1946 |
| 239,785 | Switzerland | June 17, 1946 |
| 254,856 | Switzerland | Jan. 3, 1949 |
| 1,602,628 | Germany | Mar. 2, 1950 |
| 1,612,517 | Germany | Aug. 31, 1950 |